US006488896B2

(12) United States Patent
Weigl et al.

(10) Patent No.: US 6,488,896 B2
(45) Date of Patent: Dec. 3, 2002

(54) MICROFLUIDIC ANALYSIS CARTRIDGE

(75) Inventors: Bernhard H. Weigl, Seattle, WA (US); Gerald L. Klein, Edmonds, WA (US); Ronald L. Bardell, Redmond, WA (US); Clinton L. Williams, Seattle, WA (US); Thomas H. Schulte, Redmond, WA (US)

(73) Assignee: Micronics, Inc., Redmond, WA (US)

( * ) Notice: Subject to any disclaimer, the term of this patent is extended or adjusted under 35 U.S.C. 154(b) by 0 days.

(21) Appl. No.: 09/804,777

(22) Filed: Mar. 13, 2001

(65) Prior Publication Data

US 2001/0046453 A1 Nov. 29, 2001

Related U.S. Application Data

(60) Provisional application No. 60/189,163, filed on Mar. 14, 2000.

(51) Int. Cl.[7] .................................................. G01L 11/00

(52) U.S. Cl. ......................... 422/101; 422/102; 422/55; 422/58; 422/73; 422/82.05; 436/100

(58) Field of Search ................................ 435/6; 436/34, 436/100; 422/68.1, 81, 101, 102, 55, 58, 73, 82.05

(56) References Cited

U.S. PATENT DOCUMENTS

| | | | | |
|---|---|---|---|---|
| 5,225,163 A | | 7/1993 | Andrews | |
| 5,702,953 A | | 12/1997 | Mazurek | |
| 5,716,852 A | | 2/1998 | Yager | |
| 5,922,210 A | | 7/1999 | Brody | |
| 5,932,100 A | | 8/1999 | Yager | |
| 5,972,710 A | * | 10/1999 | Weigl et al. | 436/34 |
| 5,974,867 A | | 11/1999 | Forster | |
| 6,007,775 A | | 12/1999 | Yager | |
| 6,297,061 B1 | | 10/2001 | Wu | |

FOREIGN PATENT DOCUMENTS

| | | |
|---|---|---|
| WO | WO9009596 A | 12/1997 |
| WO | WO0022436 A | 4/2000 |

* cited by examiner

*Primary Examiner*—Jill Warden
*Assistant Examiner*—Sam P. Siefke
(74) *Attorney, Agent, or Firm*—Jerrold J. Litzinger

(57) ABSTRACT

A device for analyzing sample solutions such as whole blood based on coagulation and agglutination which requires no external power source or moving parts to perform the analysis. Single disposable cartridges for performing blood typing assays can be constructed using this technology.

15 Claims, 3 Drawing Sheets

MICROFLUIDIC ANALYSIS CARTRIDGE

CROSS-REFERENCE TO RELATED APPLICATION

This patent application takes priority from U.S. Provisional Application Serial No. 60/189,163, filed Mar. 14, 2000, which application is incorporated herein in its entirety by reference.:

BACKGROUND OF THE INVENTION

1. Field of the Invention

The present invention relates generally to devices and methods for analyzing samples in microfluidic cartridges, and, in particular, to a device for analyzing sample solutions such as whole blood based on coagulation and agglutination which requires no external power source or moving parts.

2. Description of the Related Art

Microfluidic devices have recently become popular for performing analytical testing. Using tools developed by the semiconductor industry to miniaturize electronics, it has become possible to fabricate intricate fluid systems which can be inexpensively mass produced. Systems have been developed to perform a variety of analytical techniques for the acquisition of information for the medical field.

In microfluidic channels, fluids usually exhibit laminar behavior. U.S. Pat. No. 5,716,852, which patent is herein incorporated by reference in its entirety, is an example of such a device. This patent teaches a microfluidic system for detecting the presence of analyte particles in a sample stream using a laminar flow channel having at least two input channels which provide an indicator stream and a sample stream, where the laminar flow channel has a depth sufficiently small to allow laminar flow of the streams and length sufficient to allow diffusion of particles of the analyte into the indicator stream to form a detection area, and having an outlet out of the channel to form a single mixed stream. This device, which is known as a T-Sensor, allows the movement of different fluidic layers next to each other within a channel without mixing other than by diffusion. A sample stream, such as whole blood, and a receptor stream, such as an indicator solution, and a reference stream, which is a known analyte standard, are introduced into a common microfluidic channel within the T-Sensor, and the streams flow next to each other until they exit the channel. Smaller particles, such as ions or small proteins, diffuse rapidly across the fluid boundaries, whereas larger molecules diffuse more slowly. Large particles, such as blood cells, show no significant diffusion within the time the two flow streams are in contact.

Two interface zones are formed within the microfluidic channel between the fluid layers. The ratio of a detectable property, such as fluorescence intensity, of the two interface zones is a function of the concentration of the analyte, and is largely free from cross-sensitivities to other sample components and instrument parameters.

Usually, microfluidic systems require some type of external fluidic driver to function, such as piezoelectric pumps, micro-syringe pumps, electroosmotic pumps, and the like. In U.S. patent application Ser. No. 09/415,404, which application is assigned to the assignee of the present invention and is hereby incorporated by reference, microfluidic systems are described which are totally driven by inherently available internal forces such as gravity, capillary action, absorption by porous material, chemically induced pressures or vacuums, or by vacuum or pressure generated by simple manual action upon a power source located within the cartridge. Such devices are extremely simple and inexpensive to manufacture and do not require electricity or any other external power source for operation. Such devices can be manufactured entirely out of a simple material such as plastic, using standard processes like injection molding or laminations. In addition, microfluidic devices of this type are very simple to operate.

microfluidic devices of this type described can be used to qualitatively or semi-quantitatively determine analyte concentrations, to separate components from particulate-laden samples such as whole blood, or to manufacture small quantities of chemicals.

A practical use of these microfluidic devices could be in the determination of several parameters directly in whole blood. A color change in the diffusion zone of a T-Sensor detection channel can provide qualitative information about the presence of the analyte. This method can be made semi-quantitative by providing a comparator color chart with which to compare the color of the diffusion zone, similar to using a paper test strip, but with greate control and reproducibility.

It would be desirable, in many situations, to produce a device for analyzing samples in microfluidic channels based on coagulation or agglutination as a function of contact between sample analyte particles and reagent particles. An example of such an assay would be the determination of a person's blood group by bringing a drop of blood into contact with one or more antisera on a disposable microfluidic cartridge, and visually observing the flow behavior of these two solutions as they flow adjacent to each other, or mixed through sedimentation as they flow with each other through microfluidic channels. If a reaction occurs, the flow will either slow down, stop, or show another observable change that can be attributed to coagulation or agglutination.

The accuracy of the device can be enhanced by the addition of a readout system which may consist of an absorbance, fluorescence, chemiluminescence, light scatter, or turbidity detector placed such that the detector can observe an optically observable change caused by the presence or absence of a sample analyte or particle in the detection channel. Alternatively, electrodes can be placed within the device to observe electrochemically observable changes caused by the presence or absence of a sample analyte or particle within the detection channel.

SUMMARY OF THE INVENTION

Accordingly, it is an object of the present invention to provide a microfluidic device which is capable of performing diagnostic assays without the use of an external power source.

It is a further object of the present invention to provide a disposable cartridge for analyzing fluid samples which is inexpensive to produce and simple to operate.

It is another object of the present invention to provide a microfluidic analysis cartridge in which a visual analysis can be made of the sample reaction.

These and other objects are accomplished in the present invention by a simple cartridge device containing microfluidic channels which perform a variety of analytical techniques based on coagulation or agglutination without the use of external driving forces applied to the cartridge. Single disposable cartridges for performing blood typing assays can be constructed using this technology.

DETAILED DESCRIPTION OF THE PREFERRED EMBODIMENTS

The pressure required to drive a blood sample through a microfluidic channel at a specified volume flow rate is determined by the equation:

$$Hc=RQ/\rho g$$

where Hc is the head pressure, R is the fluid resistance within the channel, Q is the volume flow rate, ρ is the density of the liquid, and g is the acceleration of gravity.

The fluid resistance R can be calculated using the equation:

$$R=128\mu L/4AF_{AR}D_H$$

where $\mu$ is the dynamic viscosity of the fluid, L is the length of the channel, $F_{AR}$ is the aspect ratio (ratio of length vs. width) of the channel, $D_H$ is the hydraulic diameter of the channel, and A is the cross-sectional flow area of the channel. The characteristic dimension of a cross-sectional flow area A of a channel is the hydraulic diameter $D_H$. For a circular pipe, $D_H$ is the pipe diameter; for a rectangular channel, $D_H$ is four times the area divided by the wetted perimeter, or:

$$D_H=2/(1w+1/h)$$

where h and w are the channel cross-sectional dimensions. In the present invention, microfluidic channels are fluid passages or chambers which have at least one internal cross-sectional dimension that is less than 500 $\mu$m, and typically between about 0.1 $\mu$m and 250 $\mu$m.

The aspect ratio $F_{AR}$ represents the modification of resistance to flow in the rectangular channel due to the aspect ratio of the cross-sectional flow area. For example, two channels with the same flow area have markedly different resistance to flow if one has a square cross section and the other is very thin but wide. To allow the use of a single formula for resistance, $F_{AR}$=1 for a circular pipe. A formula for approximating the aspect ratio within 2% for a rectangular channel has been developed:

$$F_{AR}=2/3+11h(2-h/w)/24w$$

where h is less than w.

As an example, using these formulas to determine the pressure head $H_c$ required to drive blood (which has a viscosity of 3.6 times the viscosity of water), and using the following parameters:

$Q=0.2\ \mu l/sec$
$h=250\ \mu m$
$w=1000\ \mu m$
$L=200$ mm
$g=9.81\ m/s^2$
$p=1000$ kg/m3
$\mu 3.6\times10^{-3}$ Pa s then $F_{AR}=0.867$, $D_H=400\ \mu m$, $R=6.642\times10^{11}$ Pa s/$m^3$, and the pressure head Hc required to drive blood through this microfluidic channel is calculated to be 13.5 mm.

Figure 1:
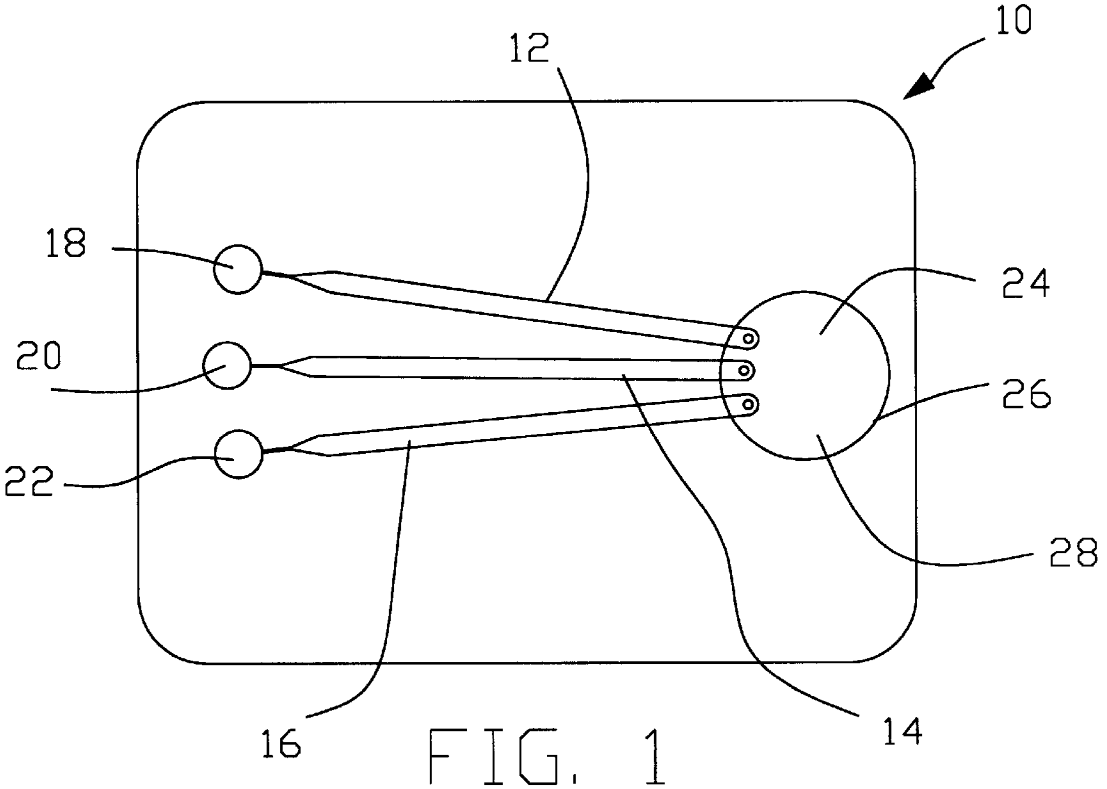
FIG. 1 is a plan view of a microfluidic cartridge used for performing blood typing according to the present invention.

Referring now to FIG. 1, there is shown a cartridge generally indicated at 10 containing the elements of the present invention. Cartridge 10 is preferably constructed from a single material, such as a transparent plastic, using a method such as injection molding or laminations, and is approximately the size and thickness of a typical credit card. Located within cartridge 10 are a series of microfluidic channels 12, 14, 16. Each of channels 12, 14, 16 are individually connected at one end to a circular inlet port 18, 20, 22 respectively, each of which couples channels 12, 14, 16 to atmosphere outside cartridge 10. The opposite ends of channels 12, 14, 16 all terminate in a circular chamber 24 under a flexible membrane 26 within cartridge 10, which preferably comprises an aspiration bubble pump. Chamber 24 may also contain a vent 28 which couples its interior to the outside of cartridge 10.

The operation of cartridge 10 can now be described. A sample, such as whole blood, is divided into three parts, to which different reagents are mixed. In the present embodiment, the blood is combined with a physiologic saline, Anti-A antisera, and Anti-B antisera and a drop of each is place on inlet ports 18, 20, 22 separately. Alternatively; a drop of blood from the sample is placed on ports 18, 20, 22, followed by a drop of different reagent for performing the assay, then mixed in the port by conventional means, such as a pipette.

The mixture is drawn into channels 12, 14, 16 via ports 18, 20, 22 respectively by capillary action, as the channels are sized to create capillary force action and draw the mixtures toward chamber 24. A reaction of the sample and reagent, such as coagulation, agglutination, or a change in viscosity, is observed within channels 12, 14, 16 as the fluids travel toward chamber 24.

Chamber 24 can be used for waste storage of the fluids after the assay is complete, and aspiration pump 26 can also assist in driving the fluids through the system.

Figure 2:
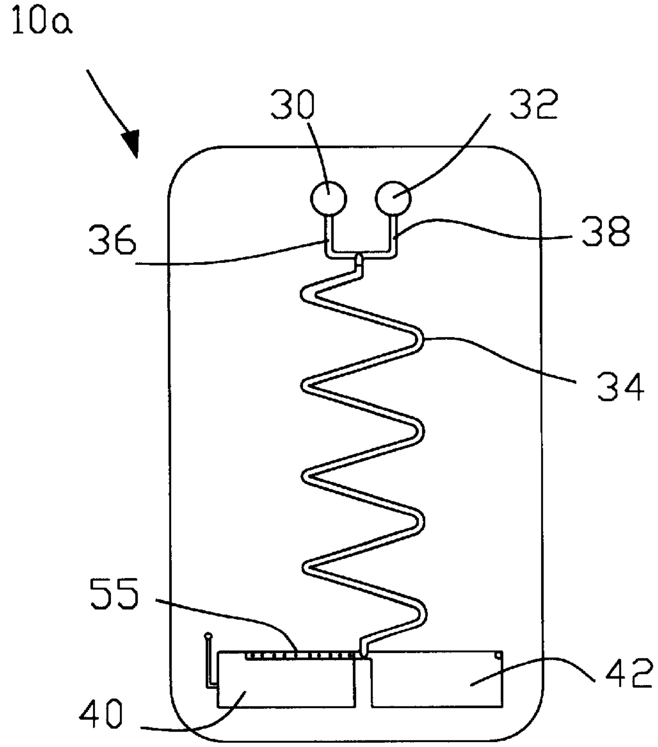
FIG. 2 is a plan view depicting an alternative embodiment of a microfluidic cartridge for performing blood typing according to the present invention.
Figure 3:
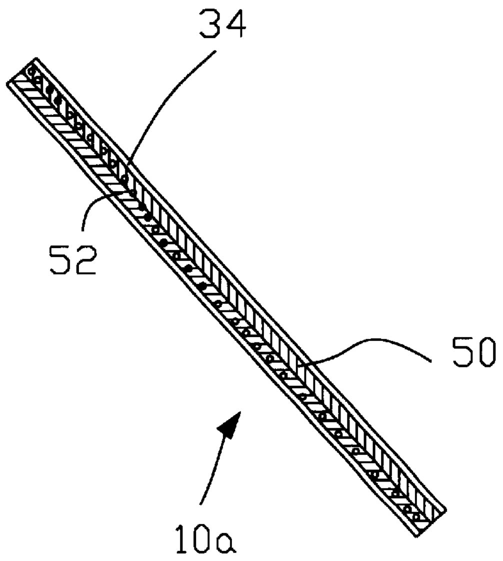
FIG. 3 is a side view of the cartridge of FIG. 2.

FIG. 2 is directed to an alternative embodiment of the present invention. A microfluidic cartridge 10*a*, manufactured in a similar manner to cartridge 10 of FIG. 1, contains a pair of inlet ports 30, 32, which connect to a reaction channel 34 via inlet channels 36, 38 respectively. Inlets 36, 38 are arranged such that they connect to channel 34 with the one above the other, such that laminar flow in channel 34 is created as shown in FIG. 3. A pair of storage chambers 40, 42 are positioned at the end of channel 34 which act as waste storage receptacles.

The driving force necessary to perform assays within cartridge 10*a* is provided by gravity. This force can be enhanced by spinning the cartridge in a centrifuge. As an example, an assay to determine blood type of a specimen sample can be performed as follows: a droplet 50 of whole blood to be typed is placed on inlet port 32, while a suitable reagent solution droplet 52 is placed upon inlet port 30. Cartridge 10*a* is then positioned at an angle to the vertical plane, allowing fluids 50, 52 to flow into channel 34. As blood drop 50 flows through inlet 38 into channel 34, it flows in the upper section of channel 34, while reagent droplet 52 flows through inlet 36 and enters channel 34 flowing in the lower section of channel 34, with the two fluids exhibiting laminar flow, as can be clearly seen in FIG. 3.

Figure 8:
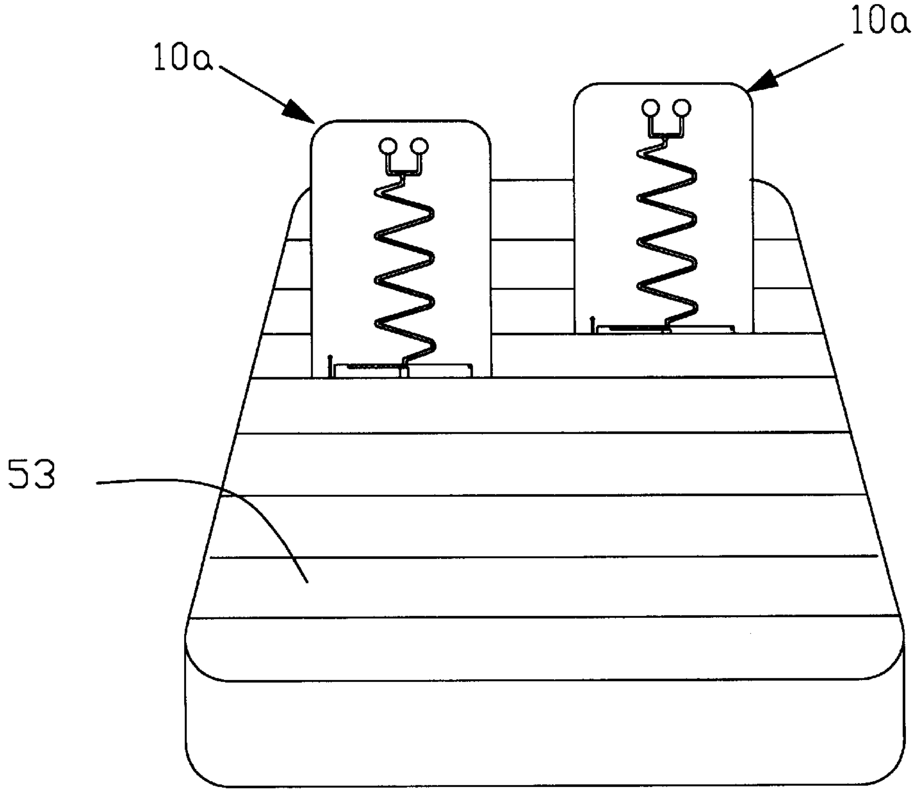
FIG. 8 is a view of a device holding microfluidic cartridges constructed according to the present invention at a constant angle.

FIG. 8 shows a device 53 which holds the cartridges at a constant angle during the assay. The angle at which the cartridge is held may be varied from vertical to horizontal. The speed of the reaction varies according to the angle. As red blood cells settle under normal gravity at the rate of 1 $\mu$m/sec., they will, after some time, settle from fluid 50 across the flow boundary into fluid 52, and begin to react with the antiserum in the reagent solution.

In the instances where the antisera in the reagent solution react with the whole blood in the specimen sample, agglutination will occur, causing a visually observable reaction which indicates the blood type of the sample. A series of channels 55 with graduated width dimensions allow agglutinated particles to travel along according to size.

Figure 4A:
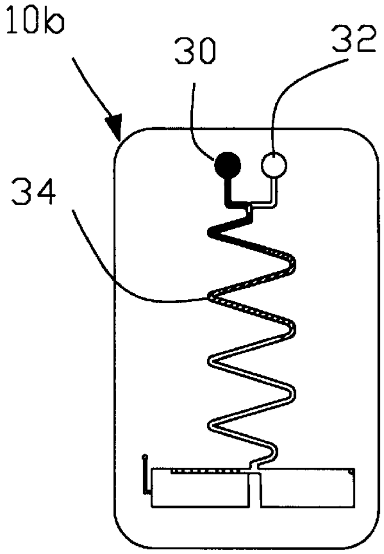
FIGS. 4A–C show a series of microfluidic cartridges according to FIG. 2 within which a diagnostic test for blood typing has been performed.
Figure 4B:
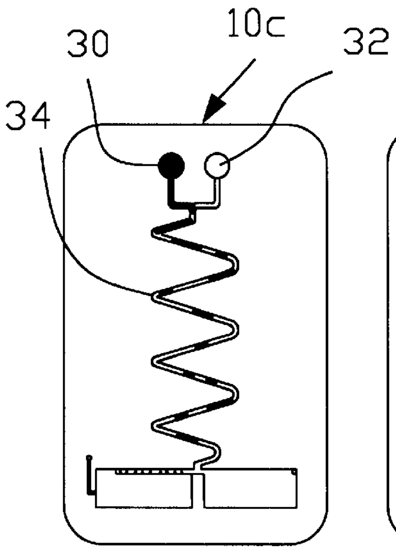
Figure 4C:
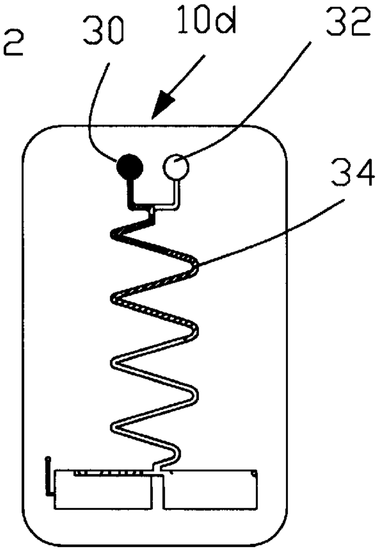

FIGS. 4A–C show a blood typing assay performed on a series of cartridges of the design taught in FIG. 2. Referring now to these figures, cartridges 10*b*, 10*c*, 10*d* show a blood typing experiment in which a blood sample listed as A-positive from the supplier is assayed. Cartridge 10*b* has whole blood placed in inlet 30 and a physiologic saline solution in inlet 32, cartridge 10*c* has blood from the same source placed in inlet 30 and Anti-A antisera placed in inlet 32, while cartridge 10 had a blood sample from the same source placed in inlet 30 and Anti-B antisera placed in inlet 32.

Figure 5A:
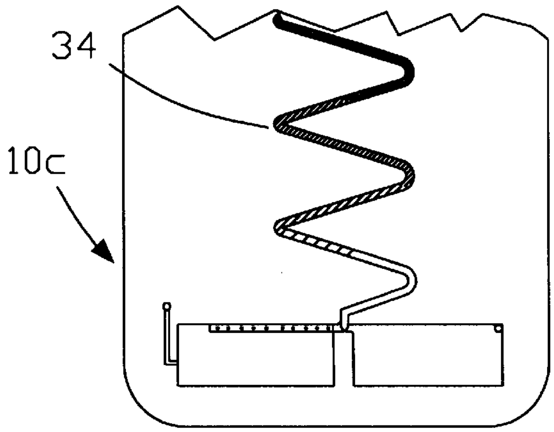
FIGS. 5A and B are additional views of FIGS. 4C and 4B, respectively, at the conclusion of the diagnostic test.
Figure 5B:
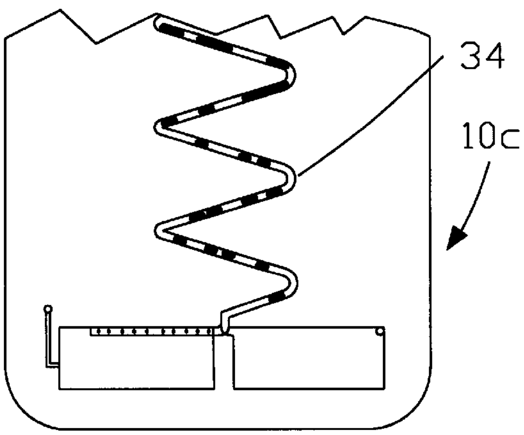

As each of the samples traveled through channel 34, driven by hydrostatic pressure, the fluids in cartridges 10*b* and 10*d* did not indicate a positive reaction, while the fluid within channel 34 of cartridge 10*c* is showing signs of agglutination, which can be visually detected within channel 34, indicating a positive reaction for A-positive blood. Views of the completed tests performed within cartridges 10*b* and 10*c* can be more clearly seen in FIGS. 5A–B.

Figure 6:
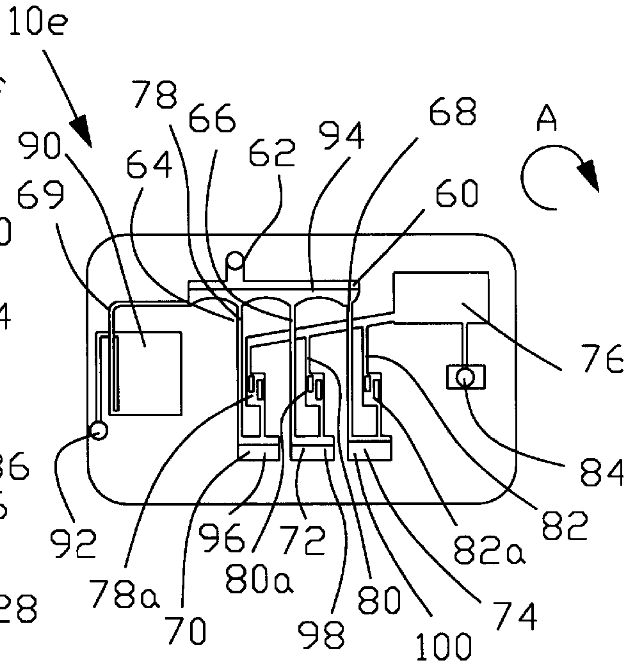
FIG. 6 is a plan view of another alternative embodiment of the microfluidic cartridge of FIG. 2.

An alternative embodiment having a blood typing device integrated into a single cartridge is shown in FIG. 6. Referring now to FIG. 6, a cartridge 10*e* contains a first chamber 60 which is coupled to a port 62, and is also connected to a series of microfluidic channels 64, 66, 68, 69. Channel 64 terminates in a chamber 70, channel 66 terminates in a chamber 72, while channel 68 terminates in a chamber 74. Each of chambers 70, 72, 74 are connected to another chamber 76 via passageways 78, 80, 82 respectively. Passageways 78, 80, 82 each have a section containing a fine grating 78*a*, 80*a*, 82*a* respectively. Chamber 76 is also coupled to atmosphere outside of cartridge 10*e* via a port 84. Channel 69 couples chamber 60 to another chamber 90, which is coupled to the exterior of cartridge 10*e* by a port 92.

To perform a blood typing assay with this device, a diluent 94 is pre-inserted into chamber 60, while chambers 70, 72, 74 are pre-filled with reagents 96, 98, 100 for detection blood types A, B and O respectively. After these preliminary steps have been taken, ports 62, 84, and 92 are sealed, preferably by covering with tape.

The analysis begins by removing the seal from port 62, and inserting a quantity of blood of an unknown type into port 62 with a syringe or pipette dropper, which sample enters chamber 60 containing diluent 94. Port 62 is then resealed, and cartridge 10*e* is shaken, allowing the blood cells to mix with diluent 94. The cells are then allowed to sediment, positioning cartridge 10*e* in the orientation shown in FIG. 6. After sedimentation, ports 62 and 92 are unsealed, which allows excess diluent 94 to travel via channel 69 into chamber 90. Next, port 84 is unsealed, allowing the diluted blood sample to flow into chambers 70, 72, 74 via channels 64, 66, 68 respectively, where it can mix with reagents 96, 98, 100. Cartridge 10*e* is then shaken briefly, and placed in a temperature-controlled environment in the orientation shown in FIG. 6 for ten minutes.

After the specified time period has elapsed, cartridge is taken from the controlled environment, and rotated 90° in the direction shown by arrow A, placing chamber 76 at the lowermost position in cartridge 10*e*. This allows the mixed solutions in chambers 70, 72, 74 to flow toward chamber 76 via passageways 78, 80, 82 respectively.

As the solutions reach fine gratings 78*a*, 80*a*, 82*a*, the cells in the chamber which contained the reagent of the unknown blood type will begin to agglutinate, causing a blockage within that particular channel, causing a visual representation of the particular blood type, as the chamber relative to that blood type has not emptied, due to clogging. Cartridge 10*e* can now be safely discarded, with ports 62, 84, 92 resealed with tape or the like to retain all fluids within the cartridge. This cartridge design is desirable, as it allows the washing of the blood cells to be analyzed prior to their contact with the antisera.

Figure 7:
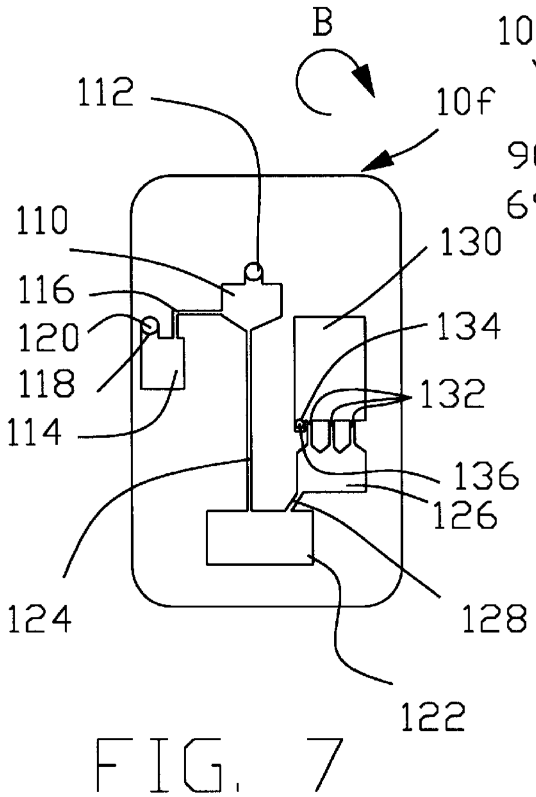
FIG. 7 is a plan view of another embodiment of the microfluidic cartridge of FIG. 2.

An alternative embodiment of a blood typing device (similar to that shown in FIG. 6) can be seen in FIG. 7. Referring now to FIG. 7, a cartridge 10*f* contains a first chamber 110 which is coupled to the exterior of the cartridge by a port 112. Chamber 110 is connected to a chamber 114 via a microfluidic channel 116. Chamber 114 contains a port 118 which couples chamber 114 to the exterior of cartridge 10*f*. Port 118 is initially blocked by a plug 120.

Chamber 110 is also connected to a chamber 122 by a channel 124. Chamber 110 is connected to a chamber 126 by a channel 128, while chamber 128 is connected to a chamber 130 via a series of parallel channels 132. Finally, chamber 130 is coupled to the exterior of cartridge 10*f* through a port 134, which is initially blocked by a plug 136.

To perform an assay using cartridge 10*f*, plug 136 is removed from port 134, and an antisera for a particular blood type is added to cartridge 10*f* through port 112. This fluid, preferably in the amount of 100 $\mu$l, flows through chamber 110 and channel 124 into chamber 122. Plug 136 is then replaced into port 134.

Next, a blood wash reagent is placed into chamber 110 via port 112, followed by a sample of blood of unknown type. These fluids are mixed within chamber 110 by shaking, then allowed to settle.

After the mixture in chamber 110 has settled, plug 120 is removed from port 118 in chamber 114, and cartridge 10*f* is carefully tilted such that the supernatant contained within chamber 110 can be removed from cartridge 10*f* through port 118. When the process is completed, plug 136 is removed from port 134, which allows the washed cells contained within chamber 110 to flow through channel 124 into chamber 122, which already contains antisera solution. The fluids are now mixed with chamber 122 by shaking, and cartridge 10*f* is then incubated for a period of time.

After incubation, cartridge 10*f* is rotated 90° in the direction shown by arrow B, causing the contents of chamber 122 to flow through channel 128 into chamber 126. If the unknown blood sample reacts with the antisera inserted into cartridge 10*f*, agglutination will clog channel 132, and chamber 130 will remain empty. If the antisera do not react with the blood sample, chamber will contain fluid from chamber 122.

While the present invention has been shown and described in terms of several preferred embodiments thereof, it will be understood that this invention is not limited to an particular embodiment and that many changes and modifications may be made without deporting from the true spirit and scope of the invention as defined in the appended claims.

What is claimed is:

1. A microfluidic device for analyzing fluids, comprising:

a body structure;

means located within said body structure for introduction of a sample fluid and a reagent fluid;

a flow channel having a first end, coupled to said introduction means, and a second end, for allowing flowing contact between said sample fluid and said reagent fluid along said flow channel such that a reaction between said fluids can occur, with said reaction causing formation of particles within said flow channel into visibly detectable clusters; and separation means, coupled to said second end of said flow channel, having varying dimensions to separate particle clusters of differing sizes.

2. The device of claim 1, wherein said sample fluid and said reagent fluid are introduced into said channel such that each forms a fluid layer contiguously flowing in parallel.

3. The device of claim 2, wherein said flowing layers are oriented such that one layer flows above the other layer, whereby allowing particles to settle from said upper layer to said lower layer.

4. The device of claim 3, wherein particles settling from said upper fluid layer combine with particles in said lower layer to cause a detectable reaction within said channel.

5. The device of claim 1, further comprising means for moving said fluids from said introduction means through said device wherein said fluid moving means requires no electrical or mechanical fluid driver.

6. The device of claim 5, wherein said fluid moving means is selected from the group consisting of: hydrostatic pressure, capillary action, fluid absorption, gravity, and vacuum.

7. The device of claim 1, wherein said flowing channel comprises a transparent channel.

8. The device of claim 7, wherein said transparent flow channel has microfluidic dimensions.

9. The device of claim 1, wherein said clusters are formed by agglutination.

10. The device of claim 1, wherein said clusters are formed by coagulation.

11. A microfluidic device for analyzing blood, comprising:

a body structure;

means located within said body structure for introduction of a whole blood sample and a reagent sample;

a whole blood sample;

a reagent sample containing a specific blood type antiserum;

and a flow channel having a first end, coupled to said introduction means, and a second end, for allowing flowing contact between said whole blood sample and said reagent sample along said flow channel such that a reaction between said samples can occur, with said reaction causing formation within said flow channel of visibly detectable clusters;

wherein the presence of visibly detectable clusters within said flow channel indicates that the blood type of said blood sample matches the specific blood type antiserum within said reagent sample.

12. The device of claim 11, wherein said whole blood sample and reagent sample are introduced into said channel such that each forms a fluid layer contiguously flowing in parallel.

13. The device of claim 12, wherein said flowing layers are oriented such that one layer flows above the other layer, whereby allowing particles to settle from said upper layer to said lower layer.

14. The device of claim 13, wherein said whole blood sample stream flows above said reagent sample stream.

15. The device of claim 14, wherein said formed detectable clusters clog said flow channel to inhibit flow.

* * * * *